(12) United States Patent
Toyoda et al.

(10) Patent No.: US 7,608,968 B2
(45) Date of Patent: Oct. 27, 2009

(54) DUST CORE AND METHOD OF MANUFACTURING THE SAME

(75) Inventors: Haruhisa Toyoda, Itami (JP); Kazuhiro Hirose, Itami (JP); Atsushi Sato, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 392 days.

(21) Appl. No.: 11/587,978

(22) PCT Filed: Apr. 25, 2005

(86) PCT No.: PCT/JP2005/007780

§ 371 (c)(1),
(2), (4) Date: Oct. 30, 2006

(87) PCT Pub. No.: WO2005/107039

PCT Pub. Date: Nov. 10, 2005

(65) Prior Publication Data

US 2008/0067887 A1    Mar. 20, 2008

(30) Foreign Application Priority Data

Apr. 30, 2004    (JP) .............................. 2004-135624

(51) Int. Cl.
*H02K 1/18* (2006.01)
(52) U.S. Cl. .................. 310/216; 310/217; 310/218; 336/233; 29/596
(58) Field of Classification Search ................. 310/44, 310/216–218, 254; 336/200, 219, 233; 29/596–598
See application file for complete search history.

(56) References Cited

U.S. PATENT DOCUMENTS

| | | | | |
|---|---|---|---|---|
| 4,330,726 A | * | 5/1982 | Albright et al. | 310/254 |
| 5,583,387 A | * | 12/1996 | Takeuchi et al. | 310/217 |
| 6,300,702 B1 | * | 10/2001 | Jack et al. | 310/216 |
| 6,903,480 B2 | * | 6/2005 | Yamamoto et al. | 310/216 |
| 7,005,764 B2 | * | 2/2006 | Petersen | 310/44 |
| 2004/0160141 A1 | * | 8/2004 | Dube | 310/218 |

FOREIGN PATENT DOCUMENTS

| | | |
|---|---|---|
| JP | 56-058764 | 5/1981 |
| JP | 2002-359938 | 12/2002 |
| JP | 2003-507991 | 2/2003 |
| JP | 2003-083251 | 3/2003 |
| JP | 2003-250252 | 9/2003 |
| JP | 2004-040871 | 2/2004 |
| JP | 2004-040948 | 2/2004 |
| WO | WO 01/12365 A1 | 2/2001 |

* cited by examiner

*Primary Examiner*—Tran N Nguyen
(74) *Attorney, Agent, or Firm*—McDermott Will & Emery LLP

(57) ABSTRACT

A stator core includes first and second annular dust core pieces. Each of the first and second annular dust core pieces has a plurality of arcuate dust core pieces each integrally having a yoke extending in an arc shape and a tooth projecting in a radial direction of the yoke. The plurality of arcuate dust core pieces are each disposed along a circumferential direction of the yoke and joined together, and the first and second annular dust core pieces are stacked in a height direction and joined together. Thereby, an increase in size of a pressing machine can be suppressed, good magnetic properties can be obtained, and handling can be facilitated.

9 Claims, 15 Drawing Sheets

DUST CORE AND METHOD OF MANUFACTURING THE SAME

RELATED APPLICATION

This application is a national phase of PCT/JP2005/007780 filed Apr. 25, 2005, which claims priority from Japanese Application No. 2004-135624 filed Apr. 30, 2004, the disclosures of which Applications are incorporated by reference herein. The benefit of the filing and priority dates of the International and Japanese Applications is respectfully requested.

TECHNICAL FIELD

The present invention generally relates to a dust core and a method of manufacturing the same, and more particularly, to a dust core used for example as a stator core for a motor and a method of manufacturing the same.

BACKGROUND ART

Conventionally, a magnetic core used for example as a stator core for a motor has been fabricated by stamping out a magnetic steel sheet material with a mold, stacking a plurality of the stamped-out magnetic steel sheets thereafter, and winding a coil on the stacked magnetic steel sheets.

Further, a technique of pressure forming magnetic powder to fabricate a magnetic core used for example as a stator core for a motor has been known, and such a technique is disclosed for example in Japanese Patent Laying-Open No. 2004-040871 (Patent Document 1).

FIG. 23 is a perspective view showing a method of manufacturing a stator core disclosed in Patent Document 1. Referring to FIG. 23, a core piece 105 in a shape vertically divided in a circumferential direction is formed by molding a composite material containing magnetic powder and an insulating member. A coil (not shown) is wound on a wire-wound portion of core piece 105. Multiple core pieces 105, each wound with the coil, are combined in the circumferential direction and joint surfaces 105a of adjacent core pieces 105 are joined together to form a stator core 110.

Patent Document 1: Japanese Patent Laying-Open No. 2004-040871

DISCLOSURE OF THE INVENTION

Problems to be Solved by the Invention

In Patent Document 1, however, if an attempt is made to manufacture a stator core having a large dimension in a height direction, a dimension H11 of core piece 105 in the height direction is increased, requiring a larger pressing machine. FIG. 24(a) is a plan view of a die of a mold used to manufacture the core piece described in Patent Document 1, and FIG. 24(b) is a schematic cross sectional view corresponding to a section along the line XXIVB-XXIVB of FIG. 24(a). Referring to FIG. 24, core piece 105 is molded in general by filling soft magnetic powder into a mold 151 and applying pressure to the soft magnetic powder from above and below (in the height direction) by an upper punch 152 and a lower punch 153, respectively. The stroke (a required movable range) of upper punch 152 and lower punch 153 is about five to six times dimension H11 of a molding in the height direction (5-6×H11). Accordingly, when dimension H11 of core piece 105 in the height direction is for example around 10 mm, the stroke of upper punch 152 and lower punch 153 is about 60 mm. On the other hand, when a stator core having a dimension in the height direction of 50 mm is to be manufactured, dimension H11 of core piece 105 in the height direction is also set at 50 mm, and the stroke of upper punch 152 and lower punch 153 is set at about 300 mm. As a result, a larger pressing machine is required.

Further, in Patent Document 1, if an attempt is made to manufacture a stator core having a large dimension in a height direction, density distribution within core piece 105 becomes uneven, deteriorating magnetic properties. As described above, if an attempt is made to manufacture a stator core having a large dimension in a height direction, dimension H11 of core piece 105 in the height direction is increased. Thereby, the upper punch and the lower punch have a greater distance therebetween when applying pressure to soft magnetic particles, and thus they fail to apply pressure to the soft magnetic particles evenly in the height direction. This results in uneven density distribution within core piece 105 in the height direction, and deterioration of magnetic properties in a low-density portion.

Furthermore, in Patent Document 1, there has been a problem that core piece 105 is difficult to be handled during manufacturing. Referring to FIG. 23, since an outer circumferential surface 108b of core piece 105 is a curved surface, if core piece 105 is kept being placed laterally (with its outer circumferential surface 108b facing down) for example while it is subjected to thermal treatment after being molded, outer circumferential surface 108b may be deformed by its own weight. For this reason, when handling core piece 105 during manufacturing, core piece 105 should be placed and kept in an upright position (with its bottom surface 108a facing down). However, since core piece 105 is in a shape having a high ratio of dimension H11 in the height direction to a dimension W11 in a width dimension (FIG. 23), core piece 105 is unstable in the upright position and may fall down. Therefore, it has been difficult to handle core piece 105 during manufacturing. In particular, if core piece 105 falls down within a furnace while it is subjected to thermal treatment after being molded, operation of the furnace should be suspended to remove the fallen core piece, causing an increase in tact time for thermal treatment.

Further, in Patent Document 1, the height of the wire-wound portion on which a coil is to be wound is the same as the overall height of stator core 110 as shown in FIG. 23. Accordingly, when a coil 106 is wound on the wire-wound portion as shown in FIG. 25, coil 106 projects from the surface of stator core 110 by a wound height H12, causing a so-called overhang. This results in an increase in size of a motor by the amount of the overhang.

Furthermore, in Patent Document 1, the wire-wound portion on which a coil is to be wound has a square corner as shown in FIG. 23. Accordingly, when coil 106 is wound on the wire-wound portion of core piece 105 as shown in FIG. 26, an insulating film of coil 106 is damaged at a square corner (a region S1) of the wire-wound portion during the winding.

Consequently, one object of the present invention is to solve the aforementioned problems, and to provide a dust core capable of suppressing an increase in size of a pressing machine even when manufacturing a dust core with a large dimension in a height direction, having good magnetic properties, and facilitating handling of pieces during manufacturing, and a method of manufacturing the same.

Another object of the present invention is to prevent an overhang of a coil, or to prevent damage to an insulating film of a coil.

Means for Solving the Problems

A dust core of the present invention includes first and second annular dust core pieces. Each of the first and second annular dust core pieces has a plurality of arcuate dust core pieces each integrally having a yoke extending in an arc shape and a tooth projecting in a radial direction of the yoke. The plurality of arcuate dust core pieces are each disposed along a circumferential direction of the yoke and joined together, and the first and second annular dust core pieces are stacked in a height direction and joined together.

A method of manufacturing a dust core of the present invention includes the steps of: forming a plurality of arcuate dust core pieces each integrally having a yoke extending in an arc shape and a tooth projecting in a radial direction of the yoke, by performing pressure forming on soft magnetic powder; fabricating each of first and second annular dust core pieces by disposing each of the plurality of arcuate dust core pieces along a circumferential direction of the yoke and joining the plurality of arcuate dust core pieces; and stacking the plurality of arcuate dust core pieces in a height direction and joining the plurality of arcuate dust core pieces.

According to the dust core and the method of manufacturing the dust core of the present invention, since the dust core is divided in the height direction into the first and the second annular dust core pieces, a dimension of the arcuate dust core piece, which constitutes each of the first and the second annular dust core pieces, in the height direction is smaller than a dimension of a piece constituting a conventional dust core in the height direction. Thereby, even when manufacturing a dust core having a large dimension in a height direction, a dimension of a piece constituting the dust core in the height direction can be maintained small, and thus an increase in size of a pressing machine can be suppressed.

Further, since the dimension of the arcuate dust core piece in the height direction is smaller than that of a conventional dust core piece, soft magnetic particles can be evenly pressed in the height direction when the arcuate dust core piece is subjected to press molding. As a result, density distribution within the arcuate dust core piece in the height direction becomes even, and thus good magnetic properties can be achieved even when manufacturing a dust core having a large dimension in a height direction.

Furthermore, since the dimension of the arcuate dust core piece in the height direction is smaller than that of a conventional dust core piece, the ratio of the dimension of the arcuate dust core piece in the height direction to a dimension of the arcuate dust core piece in a width direction is reduced. Thereby, the arcuate dust core piece can be stably kept in an upright position during manufacturing, and thus it can easily be handled.

Preferably, in the dust core described above, a joint between the plurality of arcuate dust core pieces is provided with a boundary surface formed by joining the plurality of arcuate dust core pieces. Each of the plurality of arcuate dust core pieces has a surface roughness Ry of not more than 3 μm in the boundary surface.

Accordingly, through observation of a completed dust core, it can be understood that the dust core is formed with the first and second annular dust core pieces stacked, and that the plurality of arcuate dust core pieces are each disposed along the circumferential direction of the yoke.

Preferably, in the dust core described above, the plurality of arcuate dust core pieces are fixed with a resin applied to the boundary surfaces of the arcuate dust core pieces. The resin may be an adhesive which naturally dries at room temperature, an adhesive which presents adhesive properties after thermal treatment, or an adhesive which presents adhesive properties by the anchor effect of a resin that is softened by being heated and flows into a void between particles of the arcuate dust core pieces.

Preferably, in the dust core described above, a dimension of the tooth in the height direction is smaller than a dimension of the yoke in the height direction.

Thereby, when a coil is wound on the tooth, a so-called overhang in which the coil protrudes above a surface of the yoke can be prevented, and thus an increase in size of the dust core having the coil can be suppressed.

Preferably, in the dust core described above, a corner of the tooth has a rounded shape.

Thereby, when a coil is wound on the tooth, damage to an insulating film of the coil due to a square corner of the tooth can be prevented.

Preferably, in the dust core described above, the first and second annular dust core pieces are fixed by at least one of a bolt and a combination of a recess and a protrusion, and a portion through which the bolt is inserted or one of the recess and the protrusion is located in proximity of one of an inner circumferential end face and an outer circumferential end face of the yoke that is opposite to the end face of the yoke on which the tooth is located.

In the dust core described above, lines of magnetic force are generated to extend from the tooth to the yoke or from the yoke to the tooth, and thus the lines of magnetic force exist in a region in proximity of the end face of the yoke on which the tooth is located. If the portion through which the bolt is inserted or one of the recess and the protrusion is located in this region in which the lines of magnetic force exist, magnetic properties may be deteriorated. Consequently, by disposing the portion through which the bolt is inserted or one of the recess and the protrusion in proximity of the end face of the yoke that is opposite to the end face of the yoke on which the tooth is located, the first and second annular dust core pieces can be fixed with magnetic properties prevented from being deteriorated.

Preferably, in the dust core described above, an additional annular dust core piece interposed between the first and second annular dust core pieces is further provided, and the additional annular dust core piece has the same planar shape as that of the first and second annular dust core pieces and has a straight cross section in the yoke and the tooth.

By sandwiching the additional annular dust core piece between the first and second annular dust core pieces, a dimension of each of the first and second annular dust core pieces in the height direction can further be reduced.

Preferably, in the method of manufacturing the dust core described above, a mold used for the pressure forming of each of the plurality of the arcuate dust core pieces is divided into at least a mold portion forming the tooth and a mold portion forming the yoke, and the mold portion forming the tooth is fixed relative to a die of the mold and the mold portion forming the yoke is movable relative to the die.

By fixing the mold portion forming the tooth relative to the die of the mold, the tooth can be formed in a desired shape with the strength of the mold portion forming the tooth maintained even when the tooth is formed to have a rounded corner.

EFFECTS OF THE INVENTION

As described above, according to the dust core and the method of manufacturing the dust core of the present invention, a dust core capable of suppressing an increase in size of a pressing machine even when manufacturing a dust core with a large dimension in a height direction, having good magnetic properties, and facilitating handling of pieces during manufacturing can be obtained.

DESCRIPTION OF THE REFERENCE SIGNS 1. motor, 2. tooth, 2a. projection, 3. flange, 4. yoke, 4b. projection, 4c. upper surface, 4d, 4e. end face, 5. annular dust core piece, 5a. additional annular dust core piece, 5a1, 105a. joint surface, 6, 106. coil, 6a. surface, 7. arcuate dust core piece, 9. resin, 10, 110. stator core, 11. rotor core, 12. permanent magnet, 13. rotation axis, 20. recess or protrusion, or bolt inserting portion, 21. metal magnetic particle, 22. insulating film, 23. soft magnetic particle, 24. organic substance, 31. joint surface, 32. boundary portion, 33. adhesive layer, 51. die, 52, 162b. tooth forming portion, 52a. groove, 53a. yoke-forming lower punch, 53b. a flange-forming lower punch, 54, 164. upper punch, 105. core piece, 108a. bottom surface, 108b. outer circumferential surface, 151. mold, 152. upper punch, 153. lower punch, 162a. fixed portion, 162b. tooth forming portion.

BEST MODES FOR CARRYING OUT THE INVENTION

An embodiment of the present invention will be described with reference to the drawings.

Figure 1:
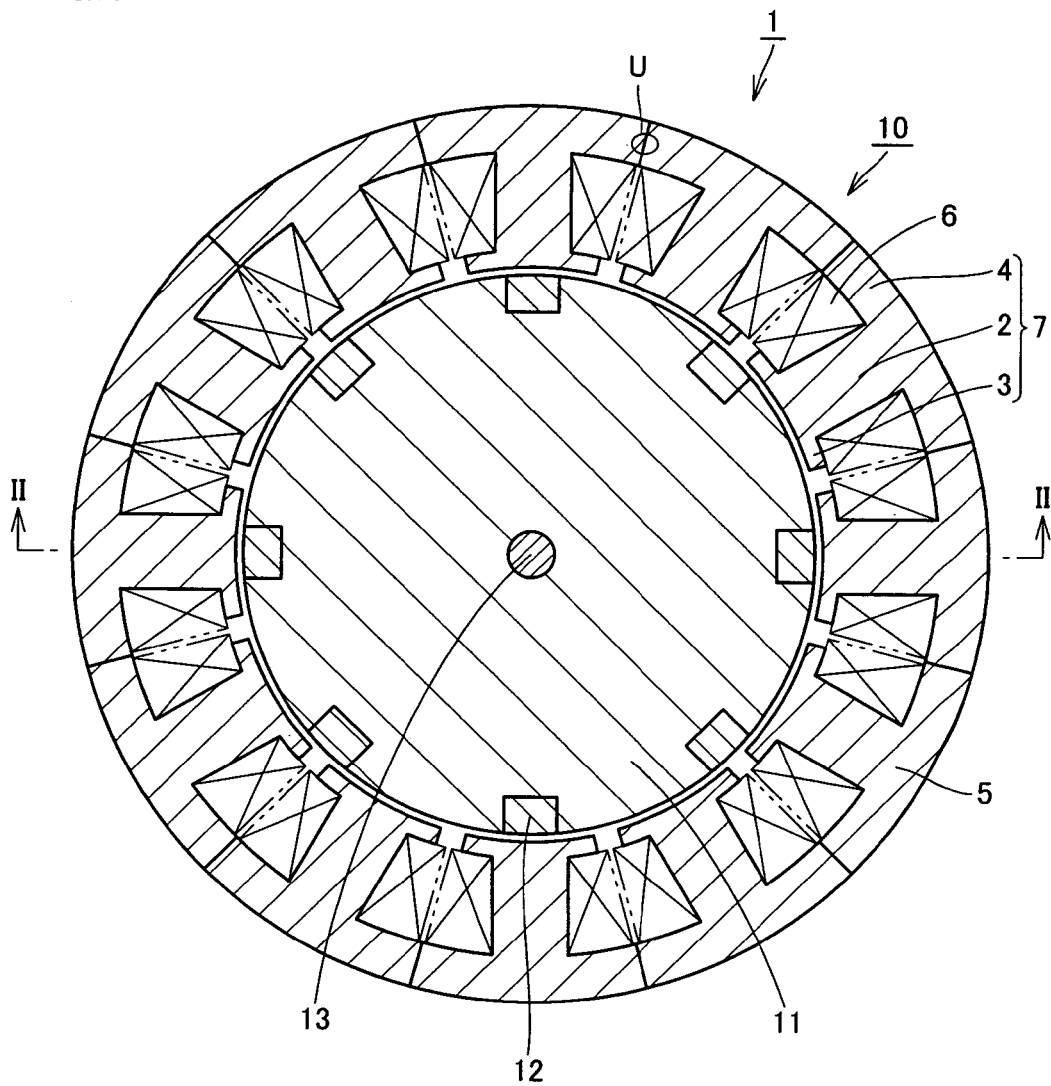
FIG. 1 is a plan view of a motor provided with a stator core fabricated in an embodiment of the present invention.
Figure 2:
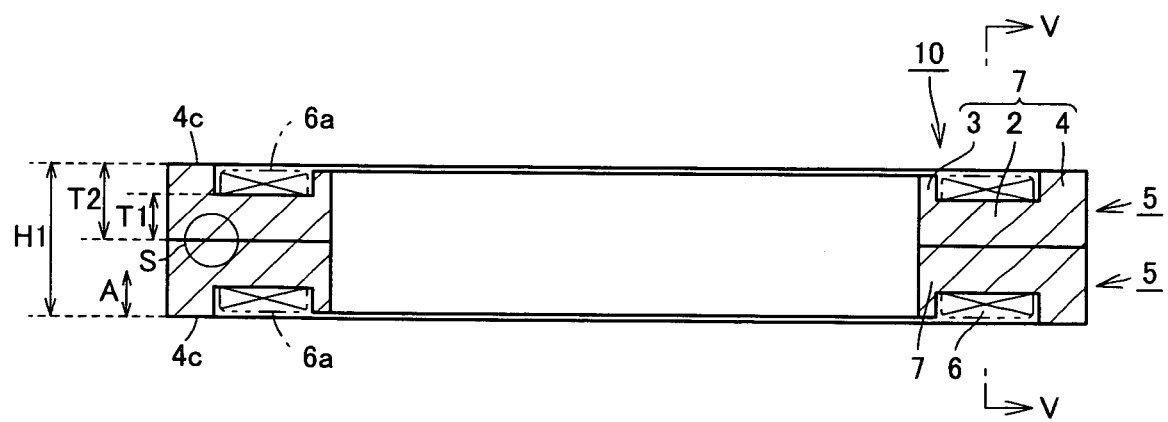
FIG. 2 is a schematic cross sectional view along the line II-II of FIG. 1.
Figure 3:
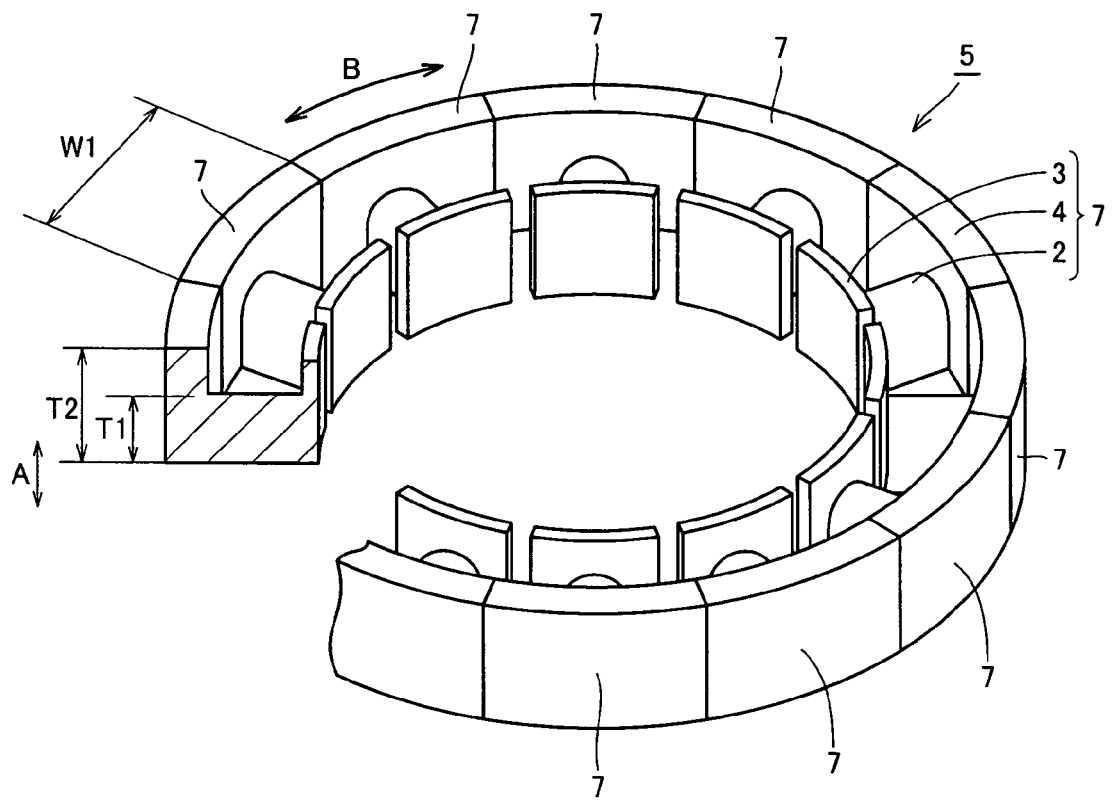
FIG. 3 is a partially broken perspective view showing a structure of an annular dust core piece.
Figure 4:
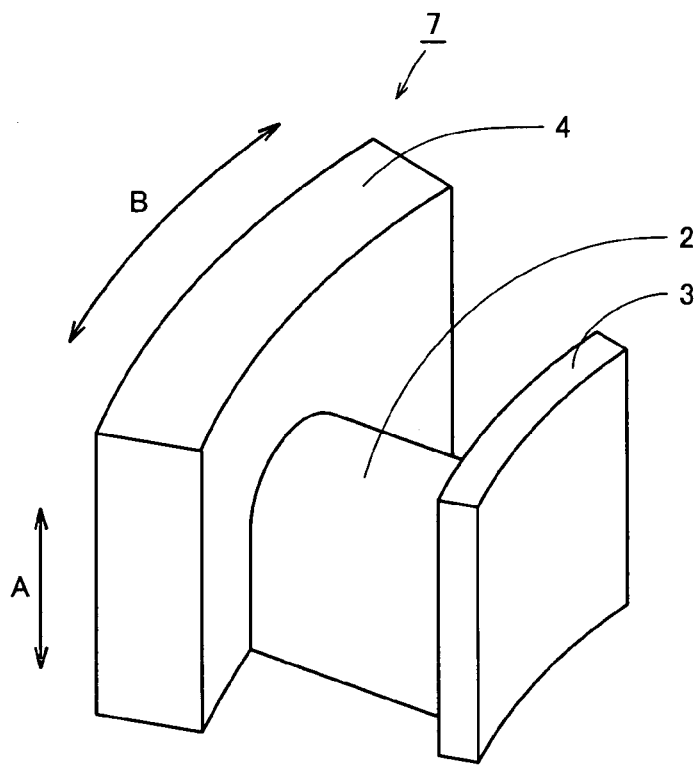
FIG. 4 is a perspective view showing a structure of an arcuate dust core piece.
Figure 5:
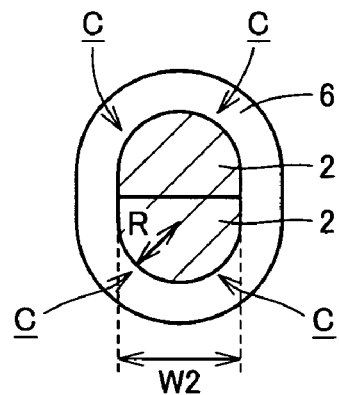
FIG. 5 is a schematic cross sectional view along the line V-V of FIG. 2.

FIG. 1 is a plan view of a motor having a stator core in an embodiment of the present invention. FIG. 2 is a schematic cross sectional view along the line II-II of FIG. 1. FIG. 3 is a partially broken perspective view showing a structure of an annular dust core piece. FIG. 4 is a perspective view showing a structure of an arcuate dust core piece. FIG. 5 is a schematic cross sectional view along the line V-V of FIG. 2.

Referring to FIG. 1, a motor 1 includes a ring-shaped stator core 10 and a cylindrical rotor core 11 disposed inside the inner periphery of stator core 10. Rotor core 11 has a rotation axis 13 in its center. Rotation of rotor core 11 about rotation axis 13 allows motor 1 to provide rotational movement. In the periphery of rotor core 11, permanent magnets 12 are embedded at intervals of a predetermined angle. Stator core 10 is formed of a plurality of soft magnetic particles joined together.

Referring to FIG. 2, stator core 10 includes first and second annular dust core pieces 5, 5. The first and second annular dust core pieces 5, 5 are stacked in a height direction thereof (in a direction indicated by an arrow A), and joined together. The first and second annular dust core pieces 5, 5 have the same planar shape.

Referring to FIGS. 3 and 4, the first and second annular dust core pieces 5, 5 have a plurality of arcuate dust core pieces 7. The plurality of arcuate dust core pieces 7 are each disposed along a circumferential direction of a yoke 4 (a direction indicated by an arrow B), and joined together. Specifically, the plurality of arcuate dust core pieces 7 are stacked in the height direction thereof (in the direction indicated by arrow A) and joined together, as well as being disposed along the circumferential direction of yoke 4 (the direction indicated by arrow B) and joined together.

Each of the plurality of arcuate dust core pieces 7 has yoke 4 extending in an arc shape in the circumferential direction, a tooth 2 projecting from yoke 4 inwardly in a radial direction of yoke 4, and a flange 3 extending in a circumferential direction at a projecting end of each tooth 2. Yoke 4, tooth 2, and flange 3 are formed integrally.

Bottom surfaces of yoke 4, tooth 2, and flange 3 constitute a flat surface. A dimension T2 of arcuate dust core piece 7 in height direction A is half a dimension H1 of stator core 10 in height direction A. Further, a dimension T1 of tooth 2 in height direction A is smaller than dimension T2 of yoke 4 in height direction A. Thereby, the upper surface of tooth 2 is located at a level lower than those of the upper surfaces of yoke 4 and flange 3 in height direction A (that is, located closer to the bottom surface). A dimension W1 indicates a dimension of arcuate dust core piece 7 in a width direction.

Referring to FIGS. 1 and 2, a coil 6 is wound on teeth 2 of two arcuate dust core pieces 7 stacked in the height direction. Coil 6 is formed of a spirally extending conducting wire coated with an insulating film. The conducting wire is wound in multiple layers in a direction away from the surfaces of teeth 2. The conducting wire is made for example of copper, and has a diameter of about 0.3 mm to 3 mm. The insulating film is made for example of a typical enamel, and has a thickness of about 30 μm. Coil 6 is disposed to be sandwiched by yoke 4 and flange 3, and thus the position of coil 6 with respect to teeth 2 is fixed.

Referring to FIG. 5, a corner C of teeth 2 on which coil 6 is wound has a rounded shape. More preferably, a curvature radius R of each corner C is for example not less than 0.3 mm and not more than 0.5×W2, where W2 is a width of teeth 2.

Figure 6A:
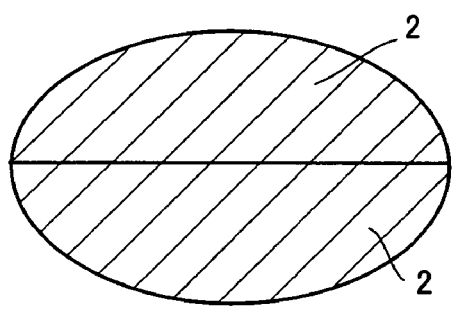
FIG. 6A is a schematic cross sectional view of teeth along the line V-V of FIG. 2.
Figure 6B:
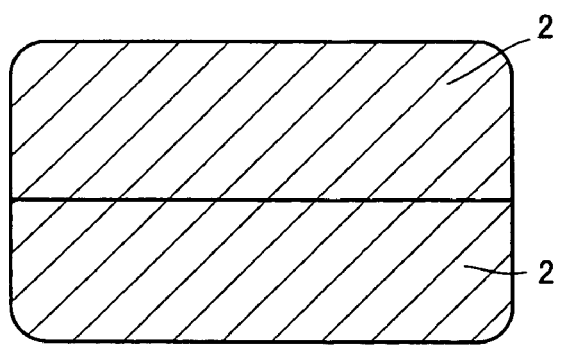
FIG. 6B is another schematic cross sectional view of the teeth along the line V-V of FIG. 2.

Although the present embodiment describes the case where the teeth have a round cross sectional shape, the rounded shape set forth in the present invention is not limited to such a case. The above-mentioned effect of preventing damage to the coil can also be achieved in a case where the teeth have an elliptical cross sectional shape as shown in FIG. 6A or a rectangular cross sectional shape with four corners rounded as shown in FIG. 6B.

Figure 7:
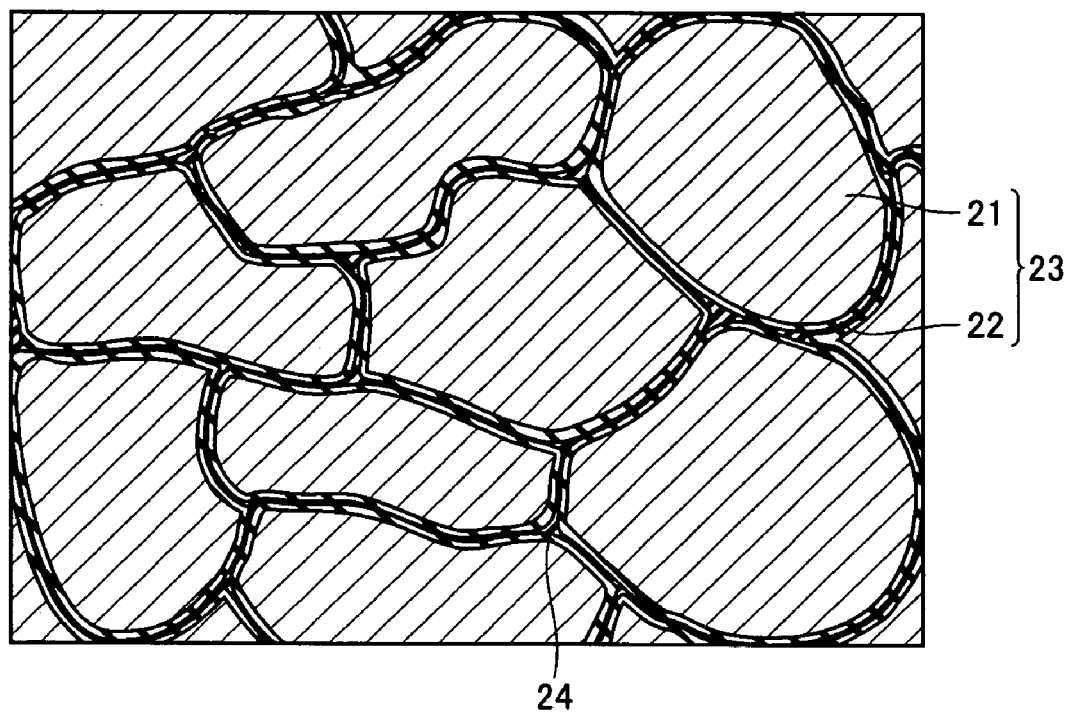
FIG. 7 is a schematic view showing an enlarged structure of a surface of the stator core in FIG. 1.

FIG. 7 is a schematic view showing an enlarged structure of a surface of the stator core in FIG. 1. Referring to FIG. 7, a plurality of soft magnetic particles 23 constituting stator core 1 each include a metal magnetic particle 21, and an insulating film 22 surrounding the surface of metal magnetic particle 21. An organic substance 24 is interposed between the plurality of soft magnetic particles 23. Soft magnetic particles 23 are joined together by organic substance 24, or by engagement between a recess and a protrusion formed in and on soft magnetic particles 23.

Metal magnetic particle 21 can be made for example of iron (Fe), an iron (Fe)-silicon (Si) based alloy, an iron (Fe)-nitrogen (N) based alloy, an iron (Fe)-nickel (Ni) based alloy, an iron (Fe)-carbon (C) based alloy, an iron (Fe)-boron (B) based alloy, an iron (Fe)-cobalt (Co) based alloy, an iron (Fe)-phosphorus (P) based alloy, an iron (Fe)-nickel (Ni)-cobalt (Co) based alloy, and an iron (Fe)-aluminum (Al)-silicon (Si) based alloy. Metal magnetic particle 21 may be made of an elemental metal or an alloy.

Insulating film 22 is formed for example by treating metal magnetic particle 21 with phosphoric acid. Further, insulating film 22 preferably contains an oxide. As insulating film 22 containing an oxide, an oxide insulator can be used, such as iron phosphate containing phosphorus and iron, manganese phosphate, zinc phosphate, calcium phosphate, aluminum phosphate, silicon oxide, titanium oxide, aluminum oxide, or zirconia oxide. Insulating film 22 may be formed in a single layer as shown in the drawing, or may be formed in multiple layers.

Insulating film 22 serves as an insulating layer between metal magnetic particles 21. By covering metal magnetic particle 21 with insulating film 22, electric resistivity $\rho$ of stator core 10 can be increased. This can suppress eddy current from flowing between metal magnetic particles 21, and reduce core loss resulting from the eddy current.

Examples of organic substance 24 include: a thermoplastic resin such as a thermoplastic polyimide, a thermoplastic polyamide, a thermoplastic polyamideimide, a polyphenylene sulfide, a polyamideimide, a polyethersulfone, a polyetherimide, or a polyether ether ketone; a non-thermoplastic resin such as a wholly aromatic polyester, a wholly aromatic polyimide, or a polyethylene of high molecular weight; and a higher fatty acid such as zinc stearate, lithium stearate, calcium stearate, lithium palmitate, calcium palmitate, lithium oleate, or calcium oleate. Further, a mixture of these substances can be used as organic substance 24. It is to be noted that a polyethylene of high molecular weight is a polyethylene having a molecular weight of not less than 100,000.

Organic substance 24 firmly joins the plurality of soft magnetic particles 23 to improve the strength of stator core 10. Further, organic substance 24 serves as a lubricant during pressure forming for obtaining stator core 10. This prevents soft magnetic particles 23 from rubbing against each other and damaging insulating film 22.

Figure 8:
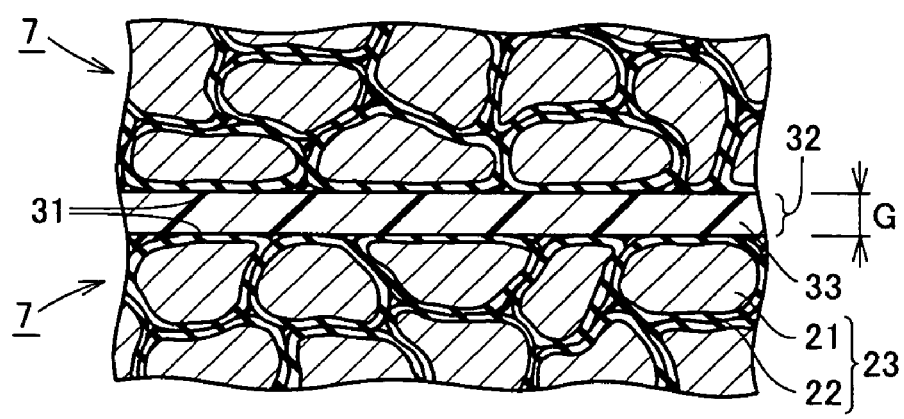
FIG. 8 is a schematic cross sectional view showing in enlarged dimension a portion close to a joint between a plurality of arcuate dust core pieces in a region S of FIG. 2 and in a region U of FIG. 1.

FIG. 8 is a schematic cross sectional view showing in enlarged dimension a portion close to a joint between the plurality of arcuate dust core pieces in a region S of FIG. 2 and in a region U of FIG. 1. Referring to FIG. 8, the joint between the plurality of arcuate dust core pieces is provided with a boundary portion 32 formed by joining the plurality of arcuate dust core pieces.

Since the plurality of arcuate dust core pieces 7 are each formed by pressure forming, surface roughness of a mold used for the pressure forming is reflected in surface roughness of a joint surface 31 of each of the plurality of arcuate dust core pieces 7. Specifically, since the mold generally has a surface roughness Ry of not more than 0.3 μm, joint surface 31 of each of the plurality of arcuate dust core pieces 7 has a surface roughness Ry of not more than 3 μm. It is to be noted that surface roughness Ry refers to maximum height Ry. In order to enhance junction between the plurality of arcuate dust core pieces 7, an adhesive layer 33 made of such as a thermoplastic polyamide may for example be formed at boundary portion 32 as shown, or there may be space at boundary portion 32.

A method of manufacturing a dust core in the present embodiment will now be described.

FIGS. 9 to 13 are explanatory views showing a method of manufacturing a dust core in an embodiment of the present invention, step by step.

Figure 9A:
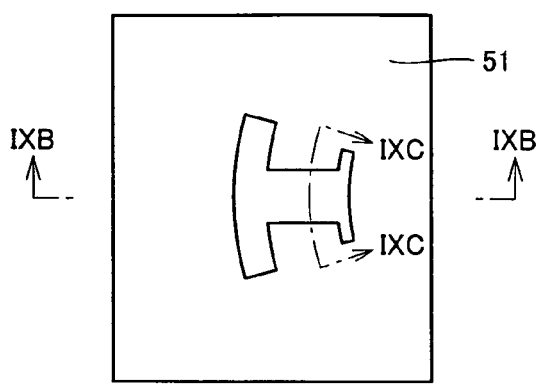
FIG. 9A is an explanatory view showing a first step of a method of manufacturing a dust core in-an embodiment of the present invention, which is a plan view of a die of a mold.
Figure 9B:
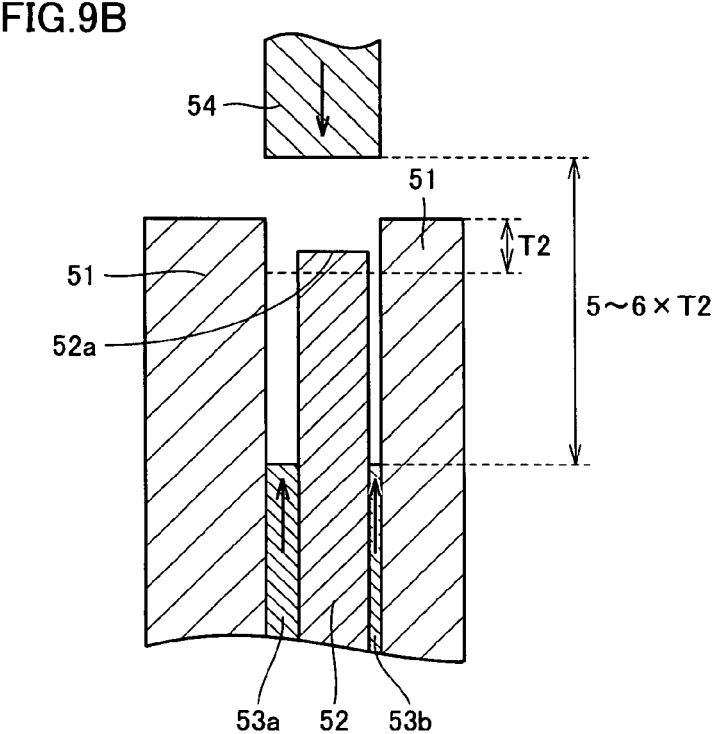
FIG. 9B is a schematic cross sectional view corresponding to a section along the line IXB-IXB of FIG. 9A.
Figure 9C:
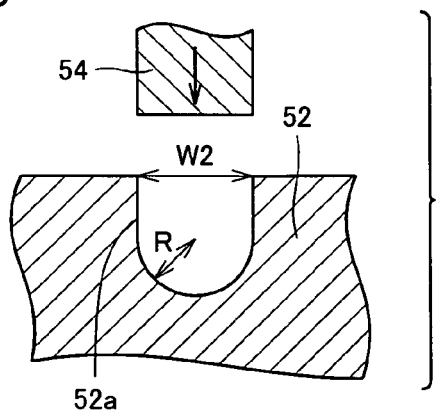
FIG. 9C is a schematic cross sectional view corresponding to a section along the line IXC-IXC of FIG. 9A.

Note that FIG. 9A is a plan view of a die of a mold, FIG. 9B is a schematic cross sectional view corresponding to a section along the line IXB-IXB of FIG. 9A, and FIG. 9C is a schematic cross sectional view corresponding to a section along the line IXC-IXC of FIG. 9A.

Figure 10A:
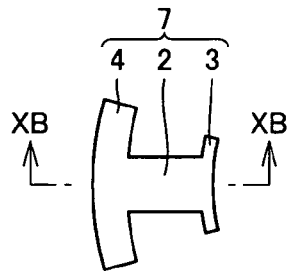
FIG. 10A is an explanatory view showing a second step of the method of manufacturing a dust core in the embodiment of the present invention, which is a plan view of the arcuate dust core piece.
Figure 10B:
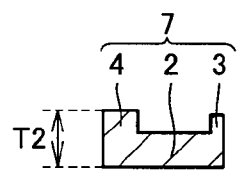
FIG. 10B is a schematic cross sectional view along the line XB-XB of FIG. 10A.
Figure 11A:
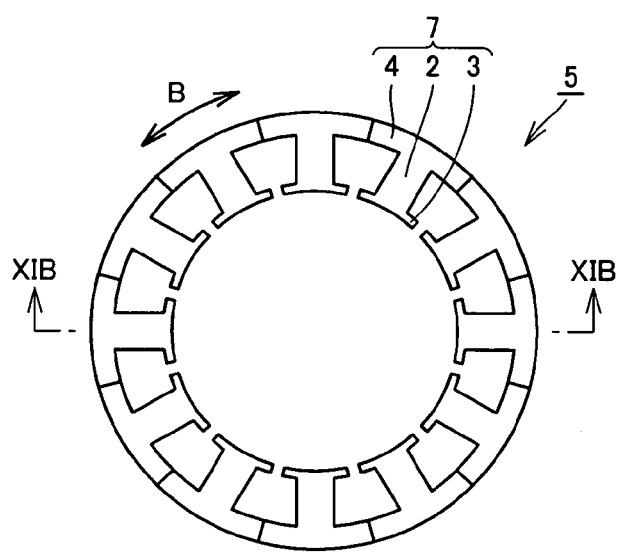
FIG. 11A is an explanatory view showing a third step of the method of manufacturing a dust core in the embodiment of the present invention, which is a plan view of the annular dust core piece.
Figure 11B:
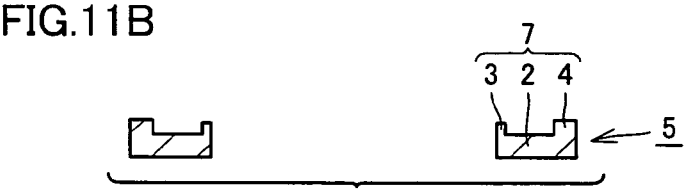
FIG. 11B is a schematic cross sectional view along the line XIB-XIB of FIG. 11A.
Figure 12A:
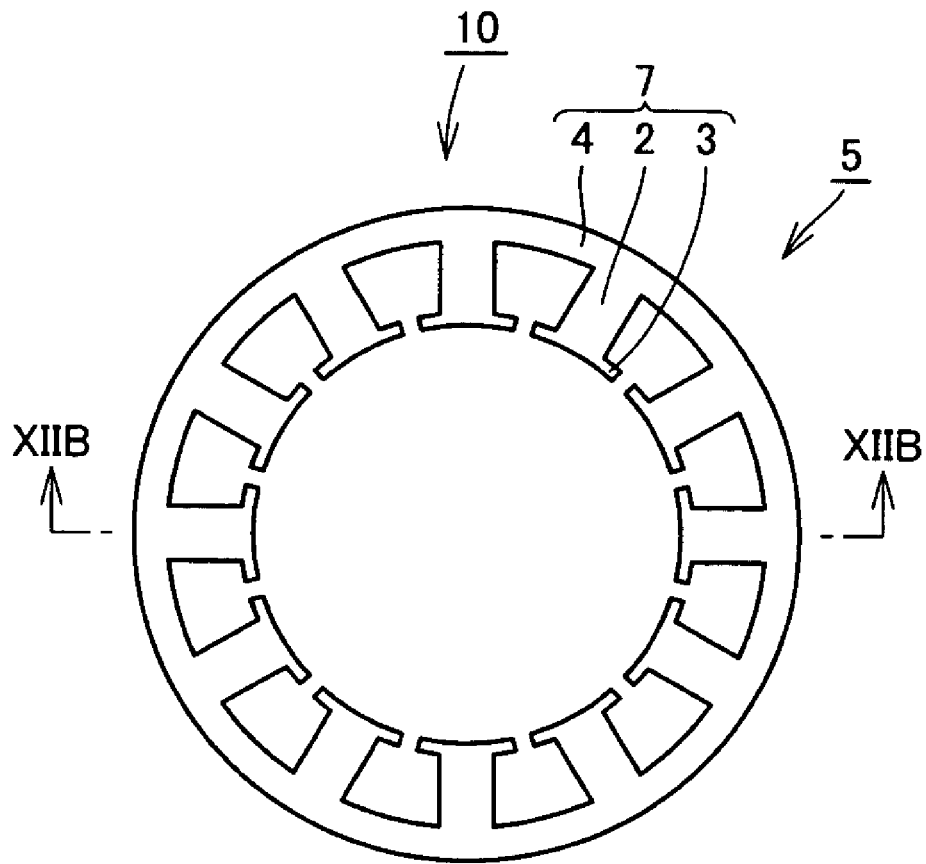
FIG. 12A is an explanatory view showing a fourth step of the method of manufacturing a dust core in the embodiment of the present invention, which is a plan view showing a condition where two annular dust core pieces are stacked.
Figure 12B:
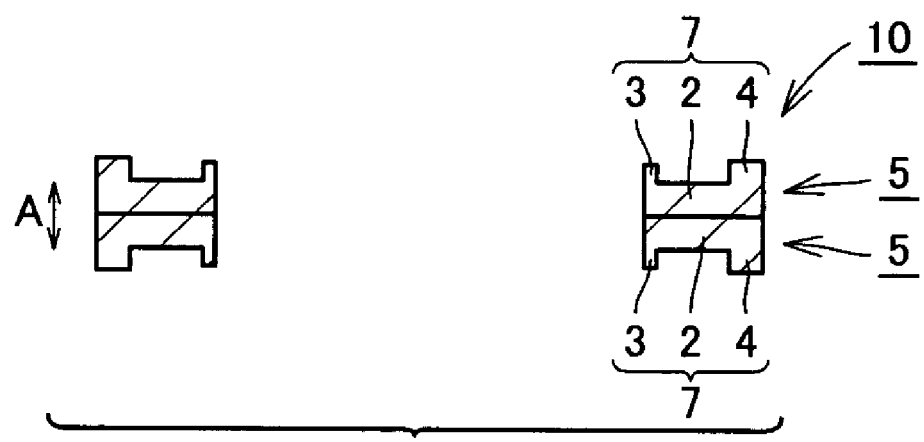
FIG. 12B is a schematic cross sectional view along the line XIIB-XIIB of FIG. 12A.
Figure 13A:
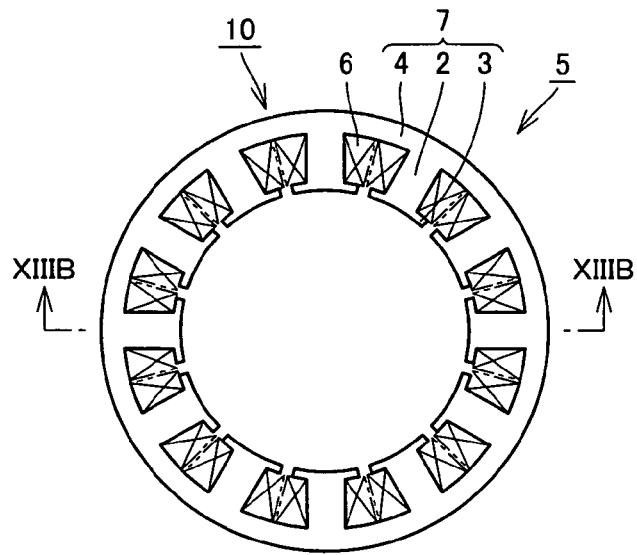
FIG. 13A is an explanatory view showing a fifth step of the method of manufacturing a dust core in the embodiment of the present invention, which is a plan view showing a condition where a coil is wound.
Figure 13B:
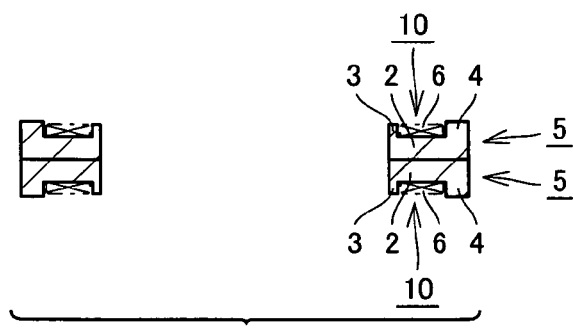
FIG. 13B is a schematic cross sectional view along the line XIIIB-XIIIB of FIG. 13A.

FIG. 10A is a plan view of the arcuate dust core piece, and FIG. 10B is a schematic cross sectional view along the line XB-XB of FIG. 10A. FIG. 11A is a plan view of the annular dust core piece, and FIG. 11B is a schematic cross sectional view along the line XIB-XB of FIG. 11A. FIG. 12A is a plan view showing a condition where two annular dust core pieces are stacked, and FIG. 12B is a schematic cross sectional view along the line XIIB-XIIB of FIG. 12A. FIG. 13A is a plan view showing a condition where a coil is wound, and FIG. 13B is a schematic cross sectional view along the line XIIIB-XIIIB of FIG. 13A.

Referring to FIGS. 9A to 9C, firstly, a mold for fabricating the arcuate dust core piece is prepared. As shown in FIG. 9B, the mold has a die 51, a yoke-forming lower punch 53a, a flange-forming lower punch 53b, a tooth forming portion 52, and an upper punch 54. Yoke-forming lower punch 53a, flange-forming lower punch 53b, and upper punch 54 are movable in upward and downward directions relative to die 51. Tooth forming portion 52 is fixed relative to the position of die 51 and does not move. Lower punch 53b may be integral with tooth forming portion 52.

The stroke (a required movable range) of upper punch 54, yoke-forming lower punch 53a, and flange-forming lower punch 53b is about five to six times dimension T2 of arcuate dust core piece 7 in the height direction (5-6×T2), which is smaller than before.

As shown in FIG. 9C, tooth forming portion 52 has a groove 52a, and the lower corner of groove 52a has a rounded shape. When the bottom of groove 52a has for example a semicircular cross section, it is more preferable that curvature radius R of the corner is not less than 0.3 mm and not more than 0.5×W2, where W2 is a width of groove 52a.

The mold is filled with soft magnetic powder (not shown) obtained by mixing soft magnetic particles 23 and organic substance 24 illustrated in FIG. 7, and pressure forming is performed under a pressure for example between 700 MPa and 1500 MPa. Preferably, pressure forming is performed in an inert gas atmosphere or a reduced-pressure atmosphere. This can suppress oxidation of the soft magnetic powder by oxygen in the air.

During the pressure forming, the yoke is applied with pressure from above and below by upper punch 54 and yoke-forming lower punch 53a, respectively, and the flange is applied with pressure from above and below by upper punch 54 and flange-forming lower punch 53b, respectively. The tooth is applied with pressure from above by upper punch 54, between tooth forming portion 52 and upper punch 54.

Referring to FIGS. 10A and 10B, the soft magnetic powder is compressed by the pressure forming, to form arcuate dust core piece 7 having yoke 4 extending in an arc shape, tooth 2 projecting inwardly in the radial direction of yoke 4, and flange 3 extending in the circumferential direction at the projecting end of tooth 2. Yoke 4, tooth 2, and flange 3 are formed integrally. Further, tooth 2 has a corner formed to have a rounded shape.

Next, arcuate dust core piece 7 is subjected to thermal treatment at a temperature of less than a thermal decomposition temperature of insulating film 22. When insulating film 22 is made for example of a phosphate film, thermal treatment is performed at a temperature of not less than 400° C. and less than 500° C. for not less than one hour. Thermal treatment at such a high temperature can remove distortions and dislocations within a molding and significantly improve magnetic properties of arcuate dust core piece 7. Further, thermal treatment does not deteriorate insulating film 22.

Referring to FIGS. 11A and 11B, the plurality of arcuate dust core pieces 7 obtained as described above are prepared, and the plurality of arcuate dust core pieces 7 are each disposed along the circumferential direction of yoke 4 (the direction indicated by arrow B) such that yokes 4 form a ring. Then, in this state, the plurality of arcuate dust core pieces 7 are joined together. Arcuate dust core pieces 7 are joined together for example by being fastened from the outer circumferential portion by means of shrink fitting or the like, being fixed by engagement between a recess and a protrusion, or being bonded with a resin. Thereby, the first annular dust core piece 5 is fabricated. The second annular dust core piece 5 is fabricated in the same way. The joint surface of arcuate dust core piece 7 can be ground to form a flat portion before arcuate dust core pieces 7 are joined together.

Referring to FIGS. 12A and 12B, the first and second annular dust core pieces 5 obtained as described above are prepared. Then, they are stacked in the height direction (the direction indicated by arrow A) and joined together. They are joined for example by being fixed by a bolt, being fixed by means of engagement between a recess and a protrusion, or being bonded with a resin. As a result of the joining described above, stator core 10 is formed. The joint surface of annular dust core piece 5 can be ground to form a flat portion before annular dust core pieces 5 are joined together. Further, after annular dust core pieces 5 are joined, a portion of flanges 3 facing a rotor can be ground in order to obtain a gap between the rotor and annular dust core pieces 5.

It has been described that the plurality of arcuate dust core pieces 7 are each disposed along the circumferential direction of yoke 4 and joined together, and thereafter the plurality of arcuate dust core pieces 7 are stacked in the height direction and joined together. In the present invention, however, instead of such a case, the plurality of arcuate dust core pieces 7 may be stacked in the height direction and joined together, and thereafter the plurality of arcuate dust core pieces 7 may be disposed along the circumferential direction of yoke 4.

Referring to FIGS. 13A and 13B, coil 6 is wound on teeth 2 of stator core 10. Coil 6 is spirally wound, using a conducting wire coated with an insulating film. Stator core 10 wound with coil 6 shown in FIG. 1 is thus completed through the steps described above.

According to the embodiment of the present invention, since stator core 10 is divided in the height direction into the first and second annular dust core pieces 5, dimension T2 of arcuate dust core piece 7, which constitutes stator core 10, in the height direction is smaller than dimension H11 of conventional core piece 105 in the height direction. Thereby, even when manufacturing a core piece having a large dimension in a height direction, a dimension of a piece constituting the core piece in the height direction can be maintained small, and thus an increase in size of a pressing machine can be suppressed.

Further, since dimension T2 of arcuate dust core piece 7 in the height direction is smaller than dimension H11 of conventional core piece 105 in the height direction, soft magnetic particles 23 can be evenly pressed in the height direction when arcuate dust core piece 7 is subjected to press molding. As a result, density distribution within arcuate dust core piece 7 in the height direction becomes even, and thus good magnetic properties can be achieved even when manufacturing a dust core having a large dimension in a height direction.

Furthermore, since dimension T2 of arcuate dust core piece 7 in the height direction is smaller than dimension H11 of conventional core piece 105 in the height direction, the ratio of dimension T2 of arcuate dust core piece 7 in the height direction to dimension W1 of arcuate dust core piece 7 in the width direction is reduced. Thereby, arcuate dust core piece 7 can be stably kept in an upright position during manufacturing, and thus it can easily be handled.

Further, as shown in FIG. 2, dimension T1 of tooth 2 in the height direction is smaller than dimension T2 of yoke 4 in the height direction. Accordingly, when coil 6 is wound on teeth 2, a so-called overhang in which a surface 6a of coil 6 protrudes above an upper surface 4c of yoke 4 can be prevented, and thus an increase in size of stator core 10 having coil 6 can be suppressed.

Further, as shown in FIG. 5, corner C of teeth 2 has a rounded shape. Accordingly, when coil 6 is wound on teeth 2, damage to an insulating film of coil 6 due to a square corner of teeth 2 can be prevented.

The mold used for the pressure forming of arcuate dust core piece 7 is divided into at least tooth forming portion 52 and yoke-forming lower punch 53a as shown in FIGS. 9A to 9C, and tooth forming portion 52 is fixed relative to die 51 and yoke-forming lower punch 53a is movable relative to die 51. Thereby, even when tooth 2 is formed to have a rounded corner, tooth 2 can be formed in a desired shape with the strength of tooth forming portion 52 maintained. Details thereof will now be described.

Figure 14:
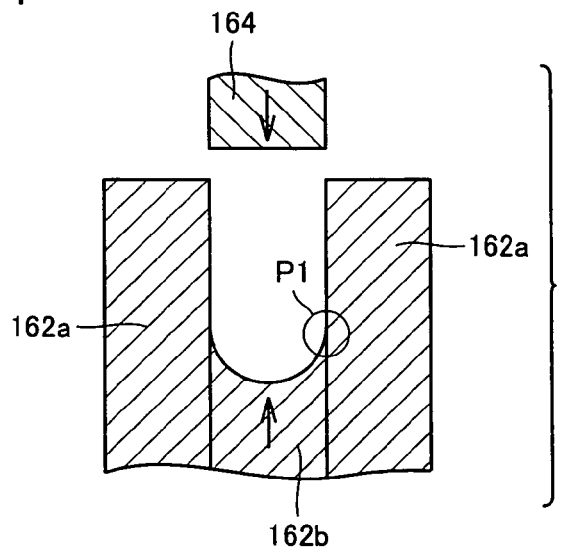
FIG. 14 is a partial cross sectional view of a tooth forming portion corresponding to the section along the line IXB-IXB of FIG. 9A in a case where the tooth forming portion is movable in upward and downward directions.

FIG. 14 is a partial cross sectional view of the tooth forming portion corresponding to the section along the line IXB-IXB of FIG. 9A in a case where the tooth forming portion is movable in upward and downward directions. Referring to FIG. 14, it is conceivable that the tooth is formed by moving a tooth forming portion 162b relative to fixed portions 162a and applying pressure from above and below by an upper punch 164 and tooth forming portion 162b, respectively. In this case, however, if tooth forming portion 162b is formed to have a rounded end face in order to form the tooth having a rounded corner, a tip portion of tooth forming portion 162b (a portion indicated by a region P1) becomes thinner, and the tip portion may be damaged by pressure applied during the pressure forming.

Figure 15:
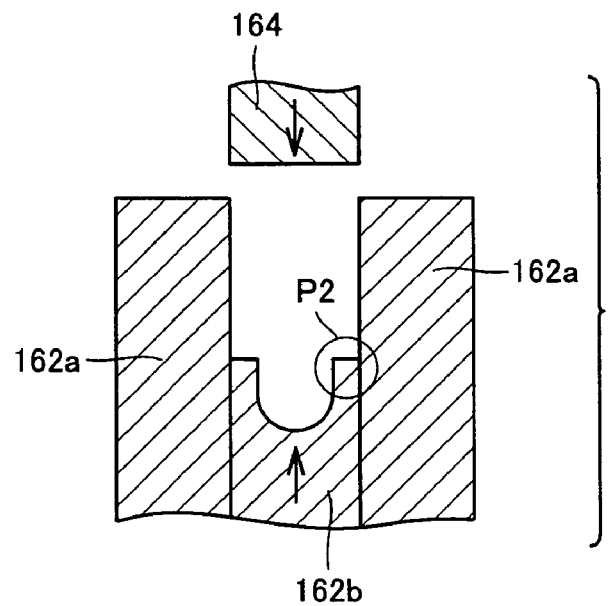
FIG. 15 is a partial cross sectional view of another tooth forming portion corresponding to the section along the line IXB-IXB of FIG. 9A in a case where the tooth forming portion is movable in upward and downward directions.
Figure 16A:
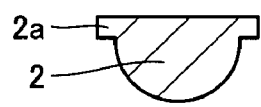
FIG. 16A is a view showing a cross sectional shape of a tooth formed using the mold of FIG. 15.
Figure 16B:
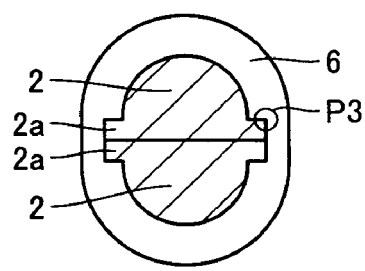
FIG. 16B is a view showing a cross sectional shape when a coil is wound on the teeth of FIG. 16A.

In order to prevent the damage, it is also conceivable that both ends of a molding surface of tooth forming portion 162b (a portion indicated by a region P2) are formed to be flat as shown in FIG. 15. In this case, however, a projection 2a is formed on tooth 2 as shown in FIG. 16A. As a result, when coil 6 is wound as shown in FIG. 16B, the insulating film of coil 6 may be damaged by a square portion (a region P3) of projection 2a.

In contrast, when tooth forming portion 52 is fixed relative to die 51 and formed not to move as shown in FIGS. 9A to 9C, the strength of tooth forming portion 52 can be maintained. Consequently, the damage to the tip portion of the tooth forming portion (the damage described referring to FIG. 14) can be prevented, and tooth 2 in a desired shape, without projection 2a shown in FIGS. 16A and 16B, can be formed.

Figure 17:
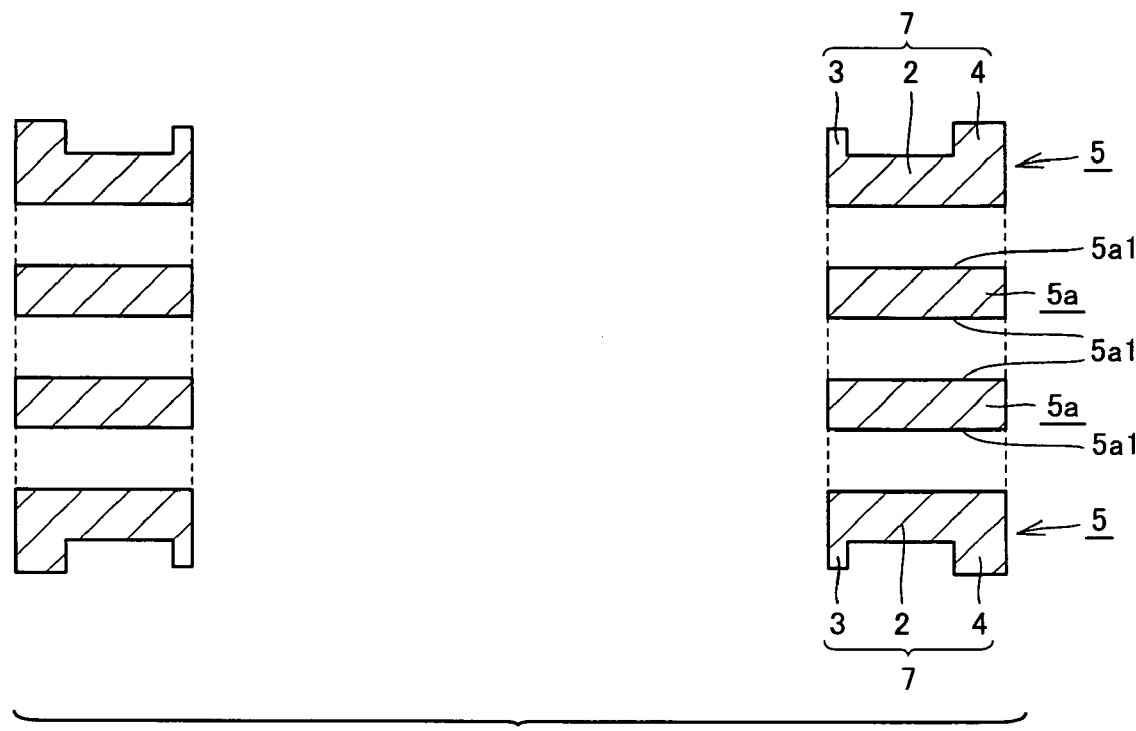
FIG. 17 is a view for illustrating a situation where an additional annular dust core piece is interposed between the two annular dust core pieces.

Although the present embodiment describes the case where stator core 10 is formed by stacking two annular dust core pieces 5, stator core 10 may be formed by stacking two annular dust core pieces 5 with one or a plurality of additional annular dust core pieces 5a interposed therebetween as shown in FIG. 17.

Additional annular dust core piece 5a has the same planar shape as that of annular dust core piece 5, and has a straight cross section in the yoke and the tooth (that is, has a flat joint surface 5a1).

When dimension H1 of stator core 10 in the height direction is significantly increased, dimension T2 of each of two annular dust core pieces 5 in the height direction is also increased, and density distribution may occur in the height direction when these pieces are formed by pressure forming. By interposing additional annular dust core piece 5a between two annular dust core pieces 5, dimension H1 of stator core 10 in the height direction can be adjusted to be increased without increasing dimension T2 of each of two annular dust core pieces 5 in the height direction. Further, since there is no need to increase dimension T2 of each of two annular dust core pieces 5 in the height direction, density distribution within annular dust core piece 5 in the height direction can be suppressed to a minimum.

Figure 18:
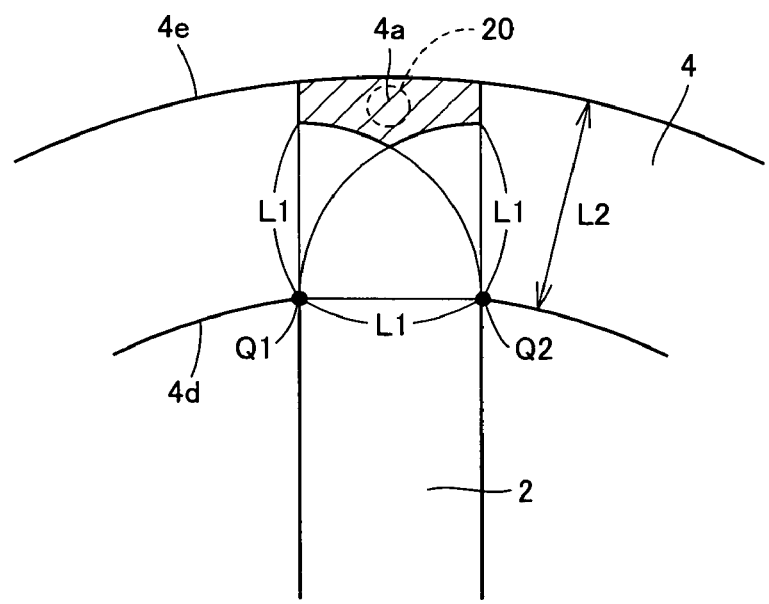
FIG. 18 is a view for illustrating a position in which a bolt inserting portion or one of a recess and a protrusion is disposed.

Further, when two annular dust core pieces 5 are fixed to each other by either one or both of a bolt and engagement between a recess and a protrusion, a portion through which the bolt is inserted, or one of a recess and a protrusion should be provided in each of two annular dust core pieces 5. In this case, referring to FIG. 18, of an inner circumferential end face 4d and an outer circumferential end face 4e of yoke 4, a bolt inserting portion 20 through which a bolt is inserted, or one of a recess and a protrusion 20 is preferably provided in proximity of the end surface of yoke 4 (in the present embodiment, outer circumferential end face 4e) that is opposite to the end face of said yoke 4 on which tooth 2 is located (in the present embodiment, inner circumferential end face 4d).

In stator core 10, lines of magnetic force are generated to extend from tooth 2 to yoke 4 or from yoke 4 to tooth 2, and thus the lines of magnetic force exist in a region in proximity of the end face of yoke 4 on which tooth 2 is located (in the present embodiment, a region in proximity of inner circumferential end face 4d). If bolt inserting portion 20 or one of recess and protrusion 20 is located in this region in which the lines of magnetic force exist, magnetic properties may be deteriorated. Consequently, by disposing bolt inserting portion 20 or one of recess and protrusion 20 in proximity of the end face of yoke 4 (in the present embodiment, outer circumferential end face 4e) that is opposite to the end face of yoke 4 on which tooth 2 is located, two annular dust core pieces 5 can be fixed with magnetic properties prevented from being deteriorated.

More preferably, bolt inserting portion 20 or one of recess and protrusion 20 is disposed in a region 4a (a hatched region) of yoke 4 outside two circular arcs drawn with one end Q1 and the other end Q2 of a root portion of tooth 2 as centers and with a radius of a tooth width L1.

This more easily allows bolt inserting portion 20 or one of recess and protrusion 20 to be disposed to avoid the region in which the lines of magnetic force extend.

Figure 19:
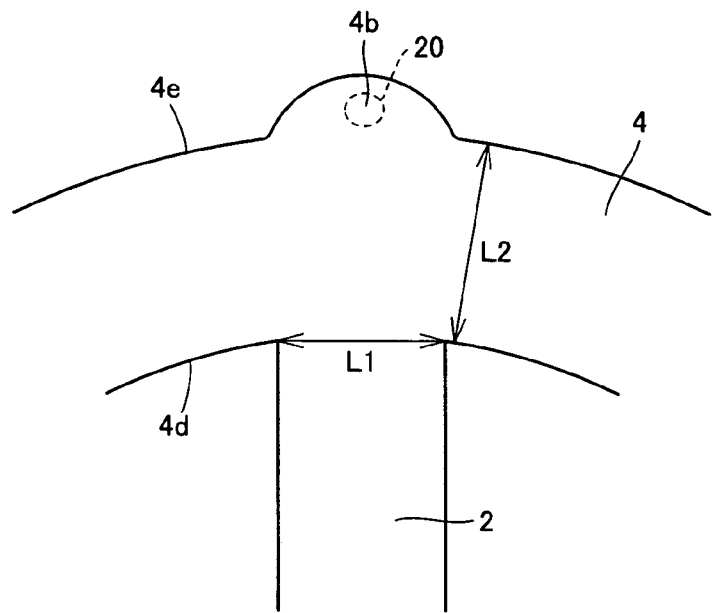
FIG. 19 is a view for illustrating another position in which a bolt inserting portion or one of a recess and a protrusion is disposed.

Further, when a width L2 of yoke 4 is smaller than width L1 of tooth 2, it is preferable to provide a projection 4b of yoke 4 on the end face of yoke 4 (in the present embodiment, outer circumferential end face 4e) that is opposite to the end face of yoke 4 on which tooth 2 is located (in the present embodiment, inner circumferential end face 4d) as shown in FIG. 19, and dispose bolt inserting portion 20 or one of recess and protrusion 20 in projection 4b.

This more easily allows bolt inserting portion 20 or one of recess and protrusion 20 to be disposed to avoid the region in which the lines of magnetic force extend.

Figure 20:
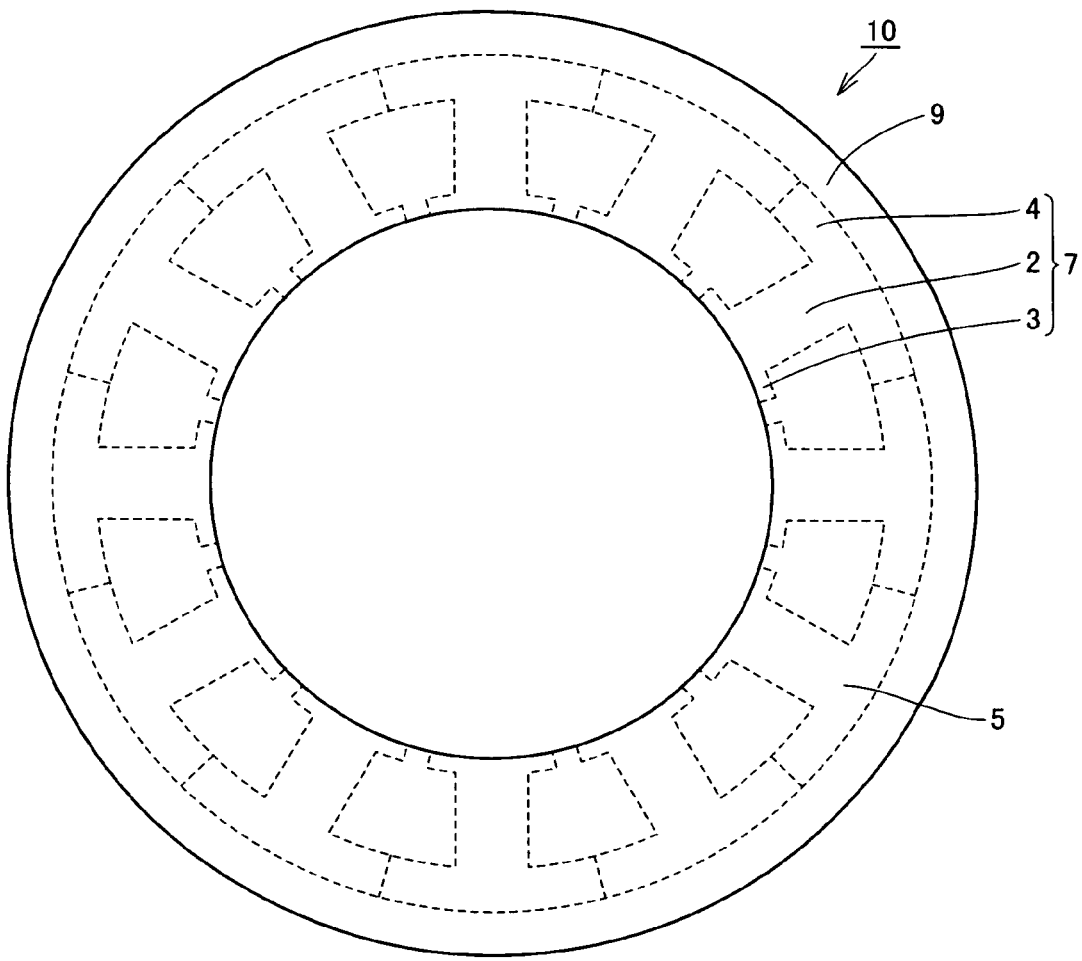
FIG. 20 is a plan view showing a structure of another stator core in the embodiment of the present invention.

In the manufacturing steps described above, each of the plurality of arcuate dust core pieces 7 may be disposed in a set-up mold and sealed with a resin. When each of the plurality of arcuate dust core pieces 7 is sealed with a resin, stator core 10 is covered with a resin 9 as shown in FIG. 20. In stator core 10 with the structure shown in FIG. 20, it is preferable that each inner circumferential surface of flange 3 is exposed from resin 9 to provide an interval of a predetermined length between flange 3 and rotor core 11.

Figure 21:
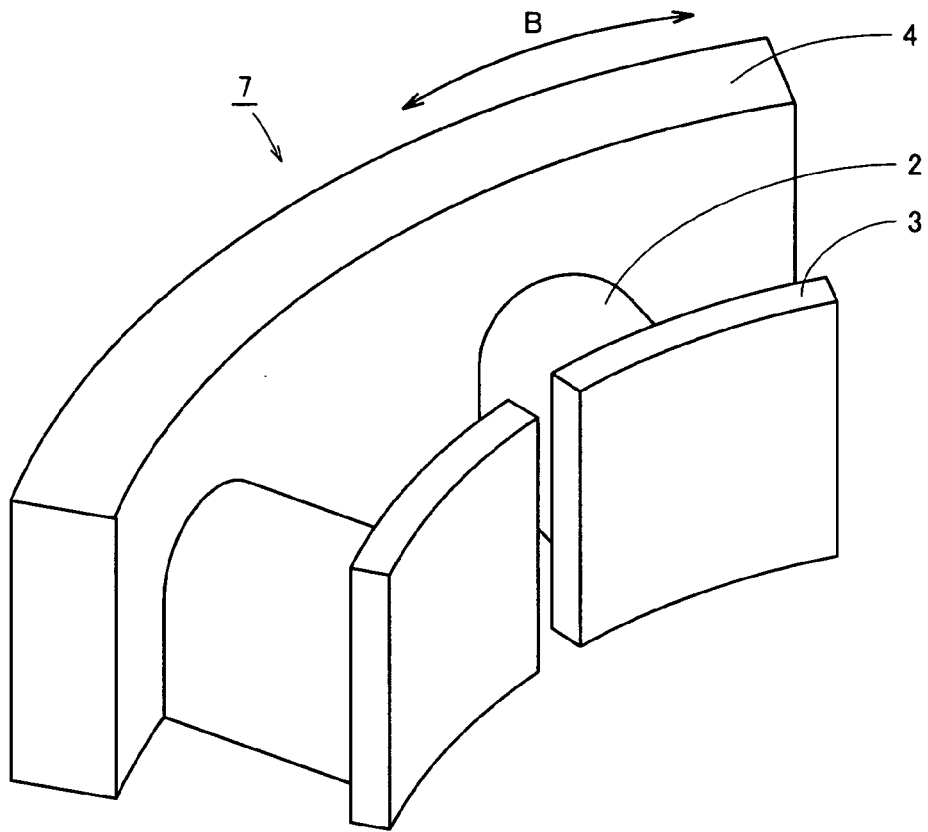
FIG. 21 is a perspective view showing a structure of another arcuate dust core piece in the embodiment of the present invention.
Figure 22:
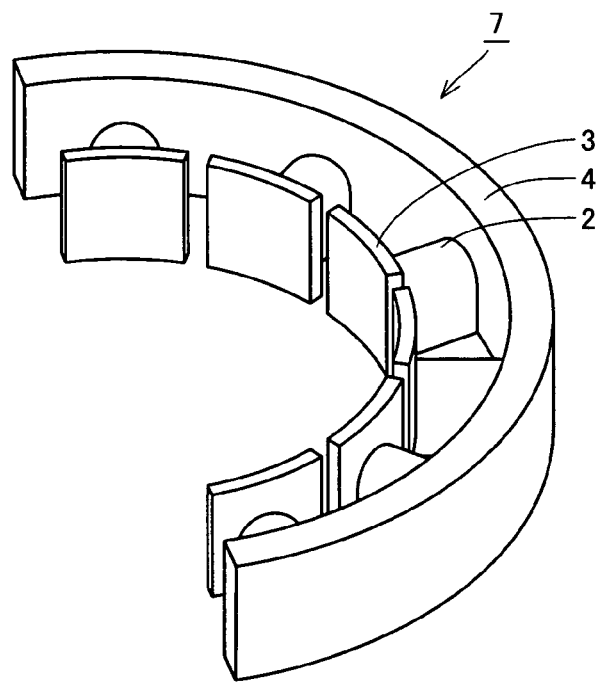
FIG. 22 is a perspective view showing a structure of still another arcuate dust core piece in the embodiment of the present invention.
Figure 23:
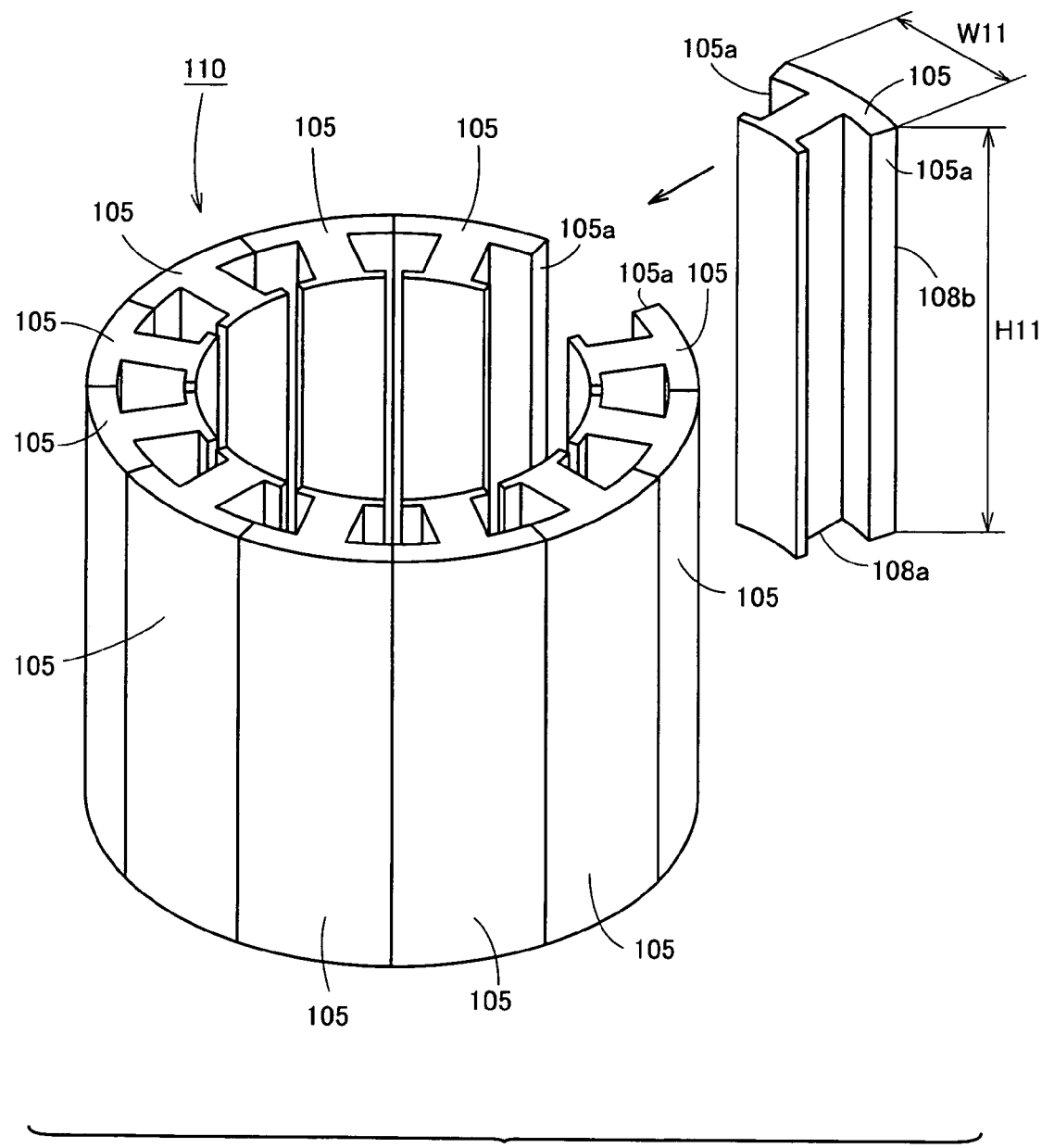
FIG. 23 is a perspective view showing a method of manufacturing a stator core disclosed in Patent Document 1.
Figure 24:
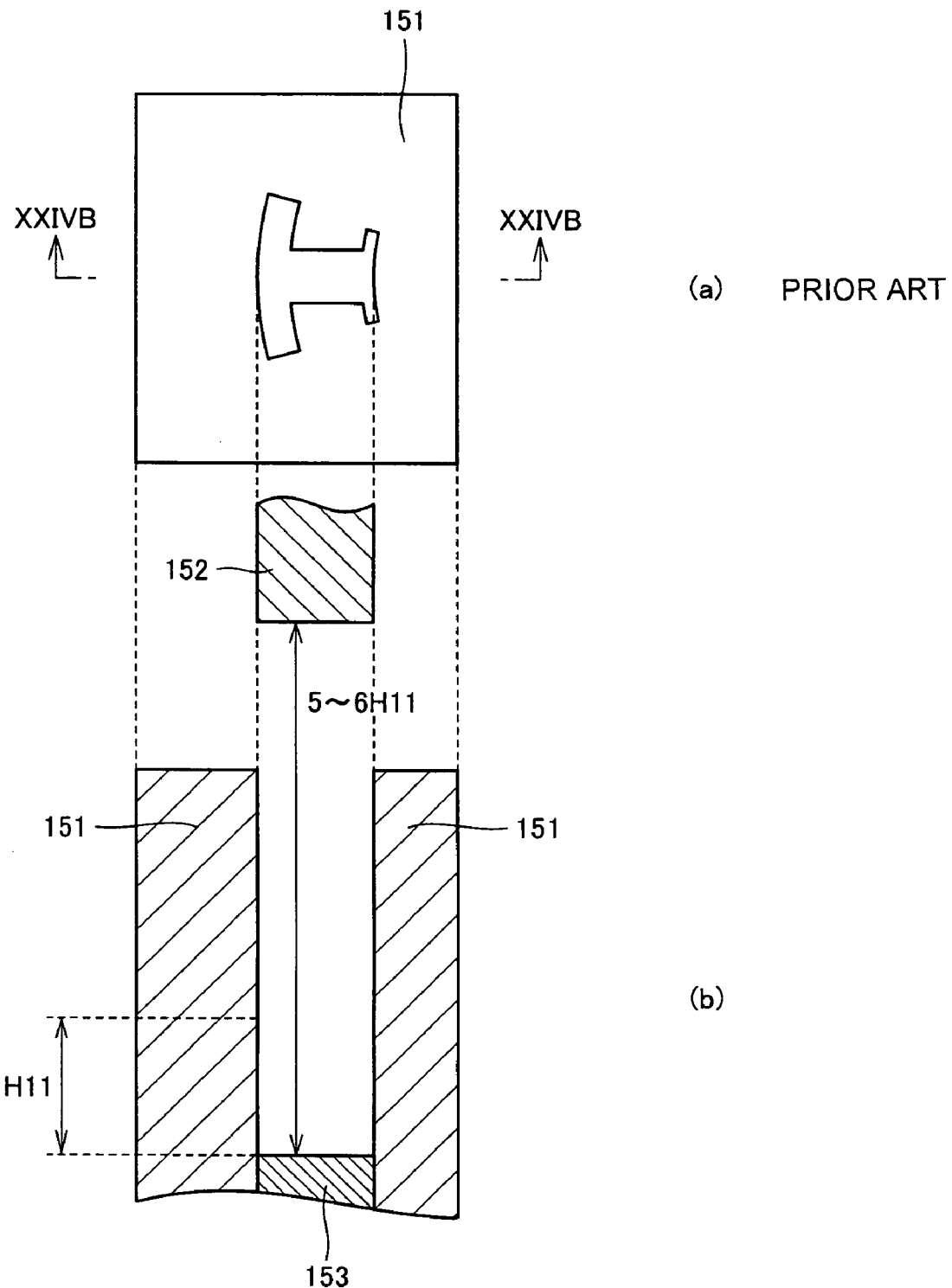
FIG. 24(a) is a plan view of a die of a mold used to manufacture a core piece described in Patent Document 1.
FIG. 24(b) is a schematic cross sectional view corresponding to a section along the line XXIVB-XXIVB of FIG. 24(a).
Figure 25:
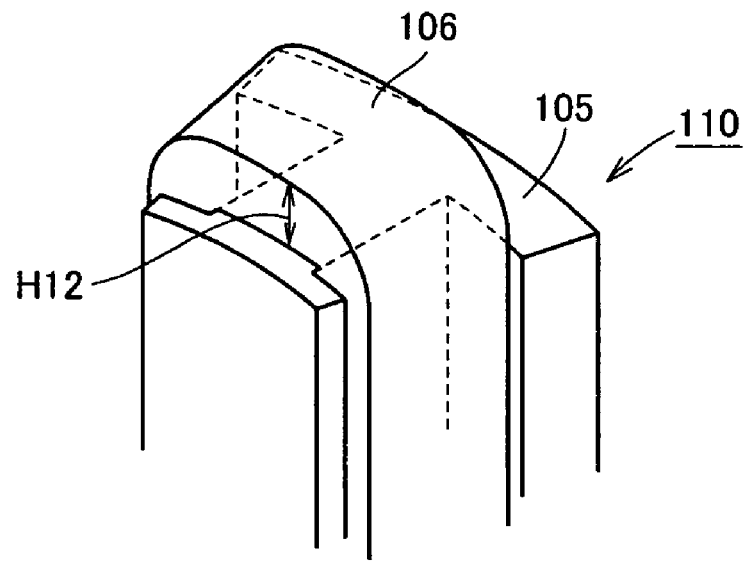
FIG. 25 is a schematic perspective view showing a state where an overhang is caused.
Figure 26:
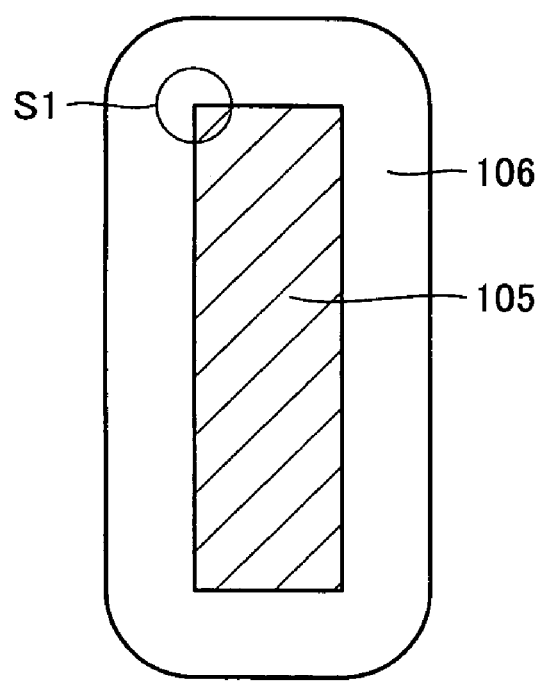
FIG. 26 is a schematic cross sectional view for describing a problem caused when a tooth has a square corner.

Further, the arcuate dust core piece may have a structure as shown in FIG. 21 or 22, instead of the structure having one tooth and one yoke as shown in FIG. 4. Arcuate dust core piece 7 in FIG. 21 has yoke 4 extending in the circumferential direction (the direction indicated by arrow B) with a length double the length of the yoke of the arcuate dust core piece in FIG. 4, two teeth 2 projecting from yoke 4 inwardly in the radial direction of yoke 4, and two flanges 3 extending in the circumferential direction at projecting ends of two teeth 2. Yoke 4, teeth 2, and flanges 3 are formed integrally. Furthermore, arcuate dust core piece 7 in FIG. 22 has yoke 4 extending in a semicircle, six teeth 2 projecting from yoke 4 inwardly in the radial direction of yoke 4, and six flanges 3 extending in the circumferential direction at projecting ends of six teeth 2. Yoke 4, teeth 2, and flanges 3 are formed integrally. Further, the annular dust core piece may be formed by combining a plurality of arcuate dust core pieces having different numbers (shapes) of yokes and teeth. By allowing one arcuate dust core piece 7 to have a plurality of teeth and yokes as the arcuate dust core piece shown in FIGS. 21 and 22, the number of pieces can be reduced.

Although the above description has been given on the structure of an inner rotor in which rotor core 11 is located inside the inner periphery of stator core 10 as shown in FIG. 1, the present invention can also be applied to the structure of an outer rotor in which a rotor core is located outside the outer periphery of a stator core.

It should be understood that the embodiment herein disclosed is, in all respects, by way of illustration only and are not by way of limitation. The scope of the present invention is set forth by the claims rather than the above description and is intended to cover all the modification within a spirit and scope equivalent to those of the claims.

The invention claimed is:

1. A dust core, comprising:
   first and second annular dust core pieces,
   wherein each of said first and second annular dust core pieces has a plurality of arcuate dust core pieces each integrally having a yoke extending in an arc shape and a tooth projecting in a radial direction of said yoke,
   said plurality of arcuate dust core pieces are each disposed along a circumferential direction of said yoke and joined together, and
   said first and second annular dust core pieces are stacked in a height direction and joined together,
   wherein said dust core further comprises an additional annular dust core piece interposed between said first and second annular dust core pieces,
   and said additional annular dust core piece has the same planar shape as that of said first and second annular dust core pieces, and has a straight cross section in said yoke and said tooth.

2. The dust core according to claim 1, wherein a joint between said plurality of arcuate dust core pieces is provided with a boundary surface formed by joining said plurality of arcuate dust core pieces.

3. The dust core according to claim 2, wherein each of said plurality of arcuate dust core pieces has a surface roughness Ry of not more than 3 µm in said boundary surface.

4. The dust core according to claim 2, wherein said plurality of arcuate dust core pieces are fixed with a resin applied to said boundary surface.

5. The dust core according to claim 1, wherein a dimension of said tooth in said height direction is smaller than a dimension of said yoke in said height direction.

6. The dust core according to claim 1, wherein a corner of said tooth has a rounded shape.

7. The dust core according to claim 1, wherein said first and second annular dust core pieces are fixed by at least one of a bolt and a combination of a protrusion and a recess, and a portion through which said bolt is inserted, or one of said protrusion and said recess is located in proximity of one of an inner circumferential end face and an outer circumferential end face of said yoke that is opposite to the end face of said yoke on which said tooth is located.

8. A method of manufacturing a dust core, comprising the steps of:
   forming a plurality of arcuate dust core pieces each integrally having a yoke extending in an arc shape and a tooth projecting in a radial direction of said yoke, by performing pressure forming on soft magnetic powder;
   fabricating each of first and second annular dust core pieces by disposing each of said plurality of arcuate dust core pieces along a circumferential direction of said yoke and joining said plurality of arcuate dust core pieces;
   forming an additional annular dust core piece having the same planar shape as that of the first and second annual dust core pieces, wherein said additional annular dust core piece has a straight cross section in the yoke and the tooth; and
   stacking said plurality of arcuate dust core pieces in a height direction and joining said plurality of arcuate dust core pieces, wherein said additional annular dust core piece is interposed between the first and second annular dust core pieces.

9. The method of manufacturing a dust core according to claim 8, wherein a mold used for the pressure forming of each of said plurality of arcuate dust core pieces is divided into at least a mold portion forming said tooth and a mold portion forming said yoke, the mold portion forming said tooth being fixed relative to a die of said mold and the mold portion forming said yoke being movable relative to said die.

* * * * *